(12) United States Patent
Kobayashi

(10) Patent No.: US 8,225,691 B2
(45) Date of Patent: Jul. 24, 2012

(54) CONICAL INVOLUTE GEAR AND GEAR PAIR

(75) Inventor: Tsune Kobayashi, Nukata-gun (JP)

(73) Assignee: JTEKT Corporation, Osaka-shi (JP)

( * ) Notice: Subject to any disclaimer, the term of this patent is extended or adjusted under 35 U.S.C. 154(b) by 1238 days.

(21) Appl. No.: 11/831,154

(22) Filed: Jul. 31, 2007

(65) Prior Publication Data

US 2008/0022800 A1    Jan. 31, 2008

(30) Foreign Application Priority Data

Jul. 31, 2006   (JP) .................................. 2006-208057

(51) Int. Cl.
*F16H 55/17* (2006.01)
*F16H 55/00* (2006.01)

(52) U.S. Cl. ........................ 74/459.5; 74/460; 74/462

(58) Field of Classification Search .................... 74/457, 74/458, 459.5, 462, 424.5, 425
See application file for complete search history.

(56) References Cited

U.S. PATENT DOCUMENTS

| | | | | | |
|---|---|---|---|---|---|
| 3,820,414 | A | * | 6/1974 | Baxter | ............................. 74/462 |
| 4,565,474 | A | * | 1/1986 | Charles | ............................ 409/51 |
| 4,703,670 | A | | 11/1987 | Kondo | |
| 5,941,124 | A | * | 8/1999 | Tan | .................................. 74/409 |
| 6,217,409 | B1 | * | 4/2001 | Stadtfeld et al. | .................. 451/5 |
| 6,916,140 | B2 | * | 7/2005 | Fleytman | ....................... 409/48 |
| 7,665,380 | B2 | * | 2/2010 | Honda | ............................ 74/458 |
| 7,698,816 | B2 | * | 4/2010 | Tan | ............................ 29/893.35 |

FOREIGN PATENT DOCUMENTS

| | | | |
|---|---|---|---|
| DE | 24 46 172 | A1 | 4/1976 |
| JP | 6-94101 | | 4/1994 |
| JP | 06094101 | A * | 4/1994 |
| JP | 6-257660 | | 9/1994 |
| JP | 2000-220725 | | 8/2000 |
| JP | 2006-90465 | | 4/2006 |
| JP | 2006-90466 | | 4/2006 |

OTHER PUBLICATIONS

Extended European Search Report issued Feb. 10, 2011, in Patent Application 07113429.0.
Office Action issued on Oct. 4, 2011 in the corresponding Japanese Patent Application No. 2006-208057.

* cited by examiner

*Primary Examiner* — Justin Krause
*Assistant Examiner* — Adam D Rogers
(74) *Attorney, Agent, or Firm* — Oblon, Spivak, McClelland, Maier & Neustadt, L.L.P.

(57) ABSTRACT

A gear pair includes a small-diameter conical involute gear having a conical angle, and a large-diameter conical involute gear having a conical angle. The small-diameter conical involute gear and the large-diameter conical involute gear are constituted by an aggregate of imaginary cylindrical gears.

3 Claims, 8 Drawing Sheets

CONICAL INVOLUTE GEAR AND GEAR PAIR

BACKGROUND OF THE INVENTION

The present invention relates to a conical gear having an involute tooth profile and a gear pair in which the conical gears are engaged.

In general, a bevel gear is used for engaging a plurality of gears which respectively rotate around a plurality of intersecting axes. In order to smoothly transmit rotation by the bevel gear, there are frequently used spiral bevel gears 103 and 104 having circular arc shaped teeth 101 and 102 and formed in a pseudo-spiral shape, as shown in FIG. 10(A).

In the manufacture of the bevel gears 103 and 104 mentioned above, the teeth 101 and 102 are machined one by one by a milling tool 107 in which a plurality of cutting chips 106 are arranged in an outer circumferential portion of a disc 105, as shown in FIG. 10(B). Accordingly, the working time is elongated and the working efficiency is lowered. Further, since a gear generating process is not employed, it is hard to form the involute tooth profile. Accordingly, the involute tooth profile may be formed by using a formed cutting blade or grinding stone in place of the milling tool 107. However, in the teeth 101 and 102 of both of the bevel gears 103 and 104, since the diameter of an inside circular arc is different from the diameter of an outside circular arc, a precise engaging position between the bevel gears 103 and 104 exists only at one position in an axial direction of the bevel gears 103 and 104 even if the involute tooth profile is obtained. Accordingly, in order to precisely engage the bevel gears 103 and 104, a high assembling precision is required.

In addition, as shown in FIG. 10(C), since one tooth surface of both tooth surfaces of each of the teeth 101 and 102 is convex, and the other tooth surface is concave, a concavo-convex relationship between a drive tooth surface and a driven tooth surface is counterchanged by reversing rotating directions of both bevel gears 103 and 104. Accordingly, if the rotating direction of the gear is different, a great difference is generated in a transmission efficiency. In the case of the gear having no involute tooth profile, the transmission efficiency is further lowered.

Further, as is apparent from FIG. 10(A), in the case where a crossing angle ($\delta 1 + \delta 2$) between the axes of the bevel gears 103 and 104 is small, a distance (hereinafter, referred to as a con-distance) R between large diameter ends of both the bevel gears 103 and 104 and a conical center thereof is elongated. Each of the bevel gears 103 and 104 is supported on a rotating table at a time of being machined. Further, each of the teeth 101 and 102 is cut by the milling tool 107 while rotating the table in increments of one pitch of each of the teeth 101 and 102. Accordingly, the longer the con-distance R becomes, the larger the radius of rotation of the table must be. As a result, a wide working space is necessary.

On the other hand, Japanese Laid-Open Patent Publication No. 6-94101 discloses a conical involute gear which can be machined by a gear hobbing machine. The conical involute gear disclosed in this publication has an involute tooth profile machined by a gear generating process. Further, as shown in FIG. 11, one gear 311 in two gears constituting a gear pair is conical, and the other gear 312 is cylindrical. Further, as described in the specification of this publication, in order to engage the gears 311 and 312 in a wide range, an addendum modification coefficient of the conical gear 311 is changed in such a manner as to draw a non-linear gentle curve in a face width direction of the gear 311. Accordingly, it is possible to bring the tooth surfaces of both the gears 311 and 312 into contact with each other approximately over a whole face width.

However, in each of the gears 311 and 321 disclosed in Japanese Laid-Open Patent Publication No. 6-94101, as is apparent from a numerical expression (8) and a numerical expression (9) described in the specification of the publication, the addendum modification coefficient is set by using numbers of teeth $z_1$ and $z_2$ of the respective gears 311 and 321 as they are. The use of the numbers of teeth $z_1$ and $z_2$ as they are for setting the addendum modification coefficient does not express the teeth perpendicular to the axis of the conical gear as is apparent from FIG. 1B of the present application and FIG. 4 of Japanese Laid-Open Patent Publication No. 6-94101, but the teeth perpendicular to the conical surface of the conical gear. Since each of the gears 311 and 321 is rotated around its own axis, a relationship between the center of rotation of each of the gears and the engagement of the tooth of each of the gears is not established even if the teeth perpendicular to the conical surface of the respective gears 311 and 321 are engaged. Accordingly, it is impossible to smoothly engage the gears, and it is impossible to achieve a suitable engaging function as the involute gear. In addition, Japanese Laid-Open Patent Publication No. 6-94101 does not mention an allocation of the addendum modification coefficient of both the gears 311 and 321. Therefore, the engagement between both the gears 311 and 321 is partly established and comes close to a point contact, and it is impossible to achieve a smooth rotation transmission.

Further, Japanese Laid-Open Patent Publication No. 6-94101 only refers to a positive addendum modification from a reference pitch point $P_0$ positioned in a small diameter end of the gear, in connection with a change of the addendum modification coefficient, and does not take into consideration positive addendum modification and negative addendum modification. Therefore, it is not possible to sufficiently correspond to a great change of the addendum modification coefficient and it is hard to achieve the conical gear having a large conical angle.

SUMMARY OF THE INVENTION

An objective of the present invention is to provide a conical involute gear that precisely engages, is easily manufactured, and achieves a wide conical angle, even in the case of helical teeth, and to provide a gear pair constituted by the conical involute gears.

To achieve the foregoing objective and in accordance with a first aspect of the present invention, a conical involute gear having an involute tooth profile is provided. The conical involute gear includes an aggregate of a plurality of imaginary cylindrical gears having the same module. Each of the imaginary cylindrical gears has an axis which is in parallel to a conical surface of the conical involute gear passing through a reference pitch point.

In accordance with a second aspect of the present invention, a conical involute gear having an involute tooth profile is provided. The conical involute gear includes an aggregate of a plurality of imaginary cylindrical gears. Each of the imaginary cylindrical gears has an axis which is in parallel to a conical surface of the conical involute gear passing through a reference pitch point. The addendum modification coefficient of each of the imaginary cylindrical gears changes non-linearly in a face width direction of the conical involute gear.

In accordance with a third aspect of the present invention, a gear pair in which at least one of two involute gears engaging with each other is a conical involute gear is provided. The conical involute gear is the conical involute gear according to the above first aspect of the present invention.

DETAILED DESCRIPTION OF THE PREFERRED EMBODIMENTS

A description will be given of one embodiment of the present invention with reference to FIG. 1(A) and FIGS. 2 to 9.

Figure 2:
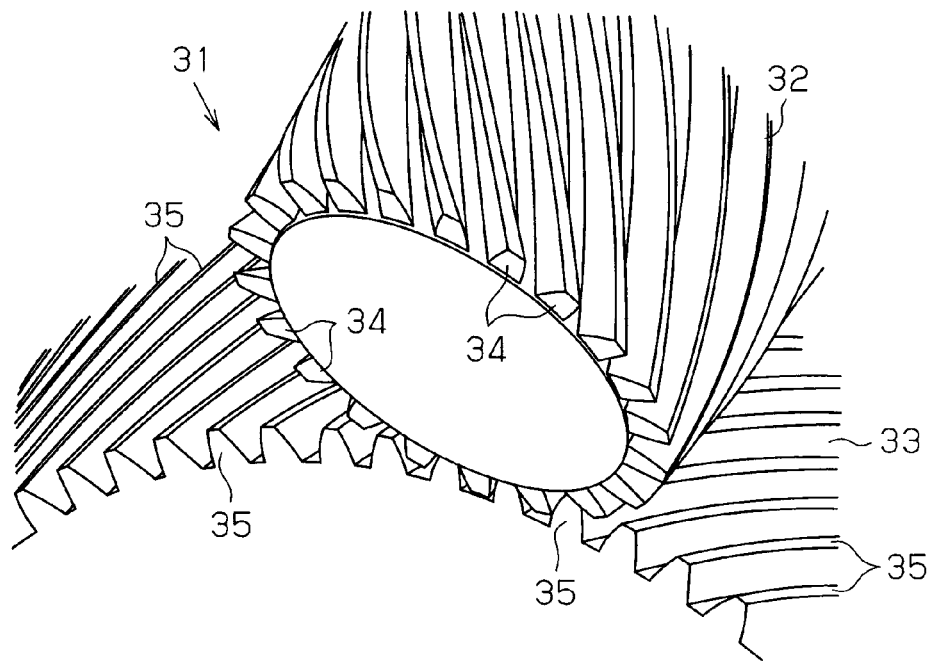
FIG. 2 is a perspective view partially showing a conical involute gear in accordance with the present embodiment.
Figure 3:
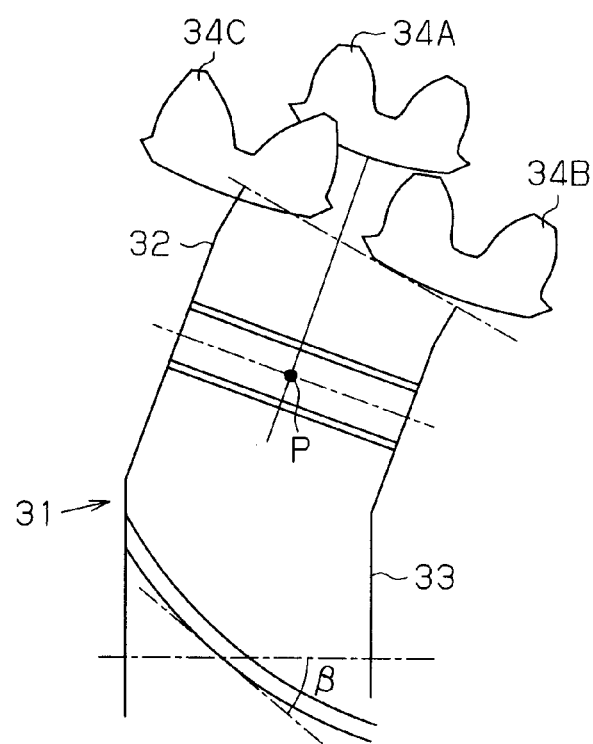
FIG. 3 is an explanatory view showing an addendum modification state and a spiral angle of a tooth.
Figure 6:
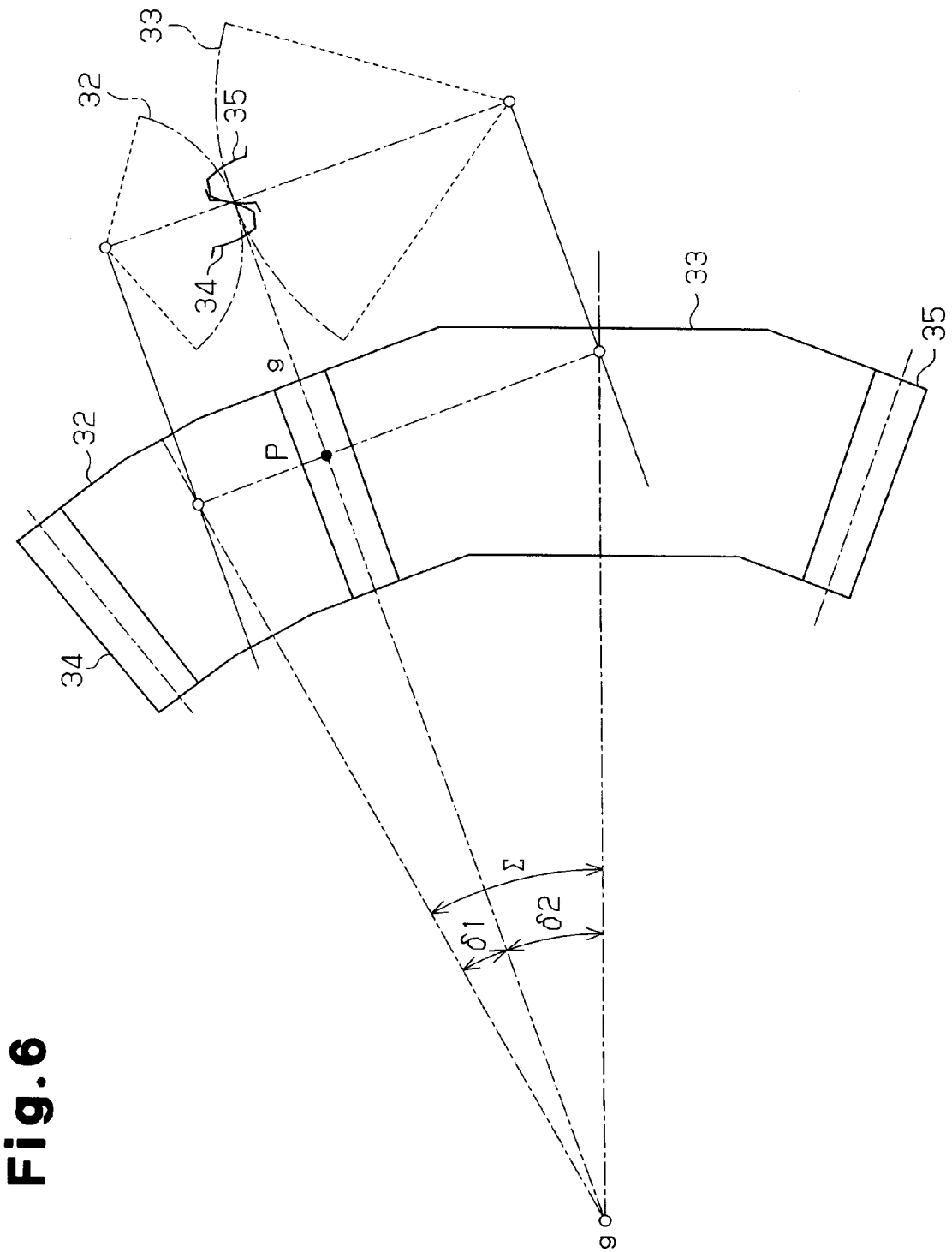
FIG. 6 is an explanatory view showing an engagement state of a conical involute gear.

As shown in FIGS. 2, 3 and 6, a gear pair 31 is constituted by a small-diameter conical involute gear (hereinafter, referred to as a small-diameter conical gear) 32, and a large-diameter conical involute gear (hereinafter, referred to as a large-diameter conical gear) 33. The gears 32 and 33 are engaged with each other, and have predetermined conical angles $\delta 1$ and $\delta 2$, respectively. The conical gear 32 has a set of teeth 34, of the number of teeth $z_1$, and the conical gear 33 has a set of teeth 35, of the number of teeth $z_2$. The teeth 34 and 35 have an involute tooth profile and are constituted by helical teeth having a spiral angle $\beta$.

Figure 7:
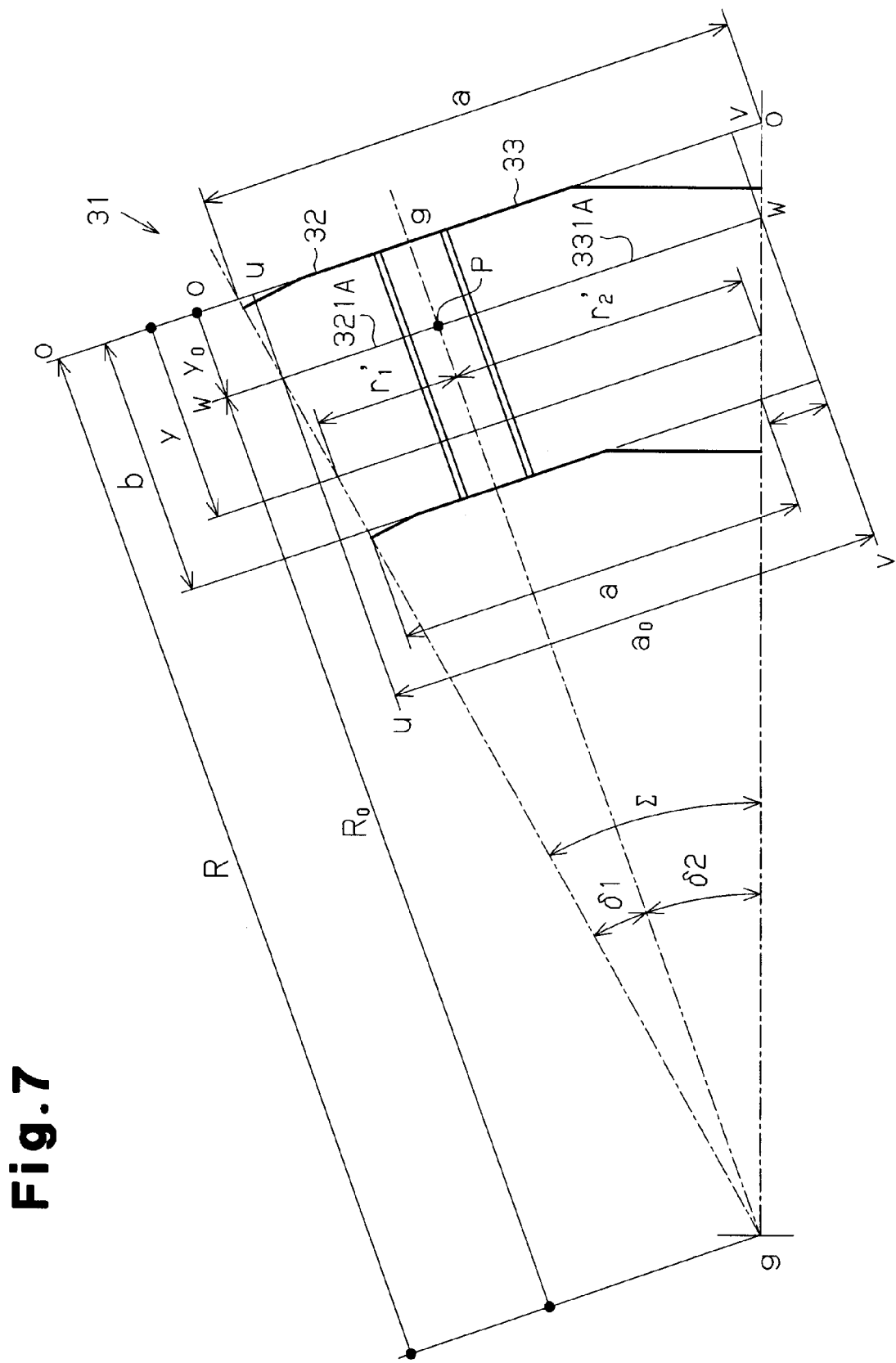
FIG. 7 is an explanatory view showing dimensions and angles of various portions of the conical involute gear.

An addendum modification coefficient of each of the teeth 34 and 35 is non-linearly changed in a width direction of the gear. In other words, as shown in FIGS. 3, 6 and 7, the addendum modification coefficient (an addendum modification amount) of each of the teeth 34 and 35 is zero in an arbitrary intermediate portion in the width direction thereof, is negative in a small-diameter side from the center portion, and is positive in a large-diameter side from the center portion. In this embodiment, a position at which the addendum modification coefficient is zero is defined as a reference pitch point P. FIG. 3 shows a tooth 34A existing at the position at which the addendum modification coefficient is zero, a tooth 34B profile shifted to the negative side, and a tooth 34C profile shifted to the positive side, respectively.

In this case, values of the conical angles $\delta 1$ and $\delta 2$ can be optionally set in correspondence to a specification of each of the gears 32 and 33. In this embodiment, these values are set in such a manner as to satisfy a relationship of numerical expression 1 in the present embodiment. In the expression 1, $\delta 1$ denotes the conical angle of the small-diameter conical gear 32, $\delta 2$ denotes the conical angle of the large-diameter conical gear 33, $z_1$ denotes the number of teeth of the small-diameter conical gear 32, and $z_2$ denotes the number of teeth of the large-diameter conical gear 33.

$$\sum = \delta_1 + \delta_2$$

$$\tan\delta_1 = \frac{\sin\sum}{\frac{z_2}{z_1} + \cos\sum}$$

$$\tan\delta_2 = \frac{\sin\sum}{\frac{z_2}{z_1} + \cos\sum}$$

Numerical Expression 1

Figure 1:
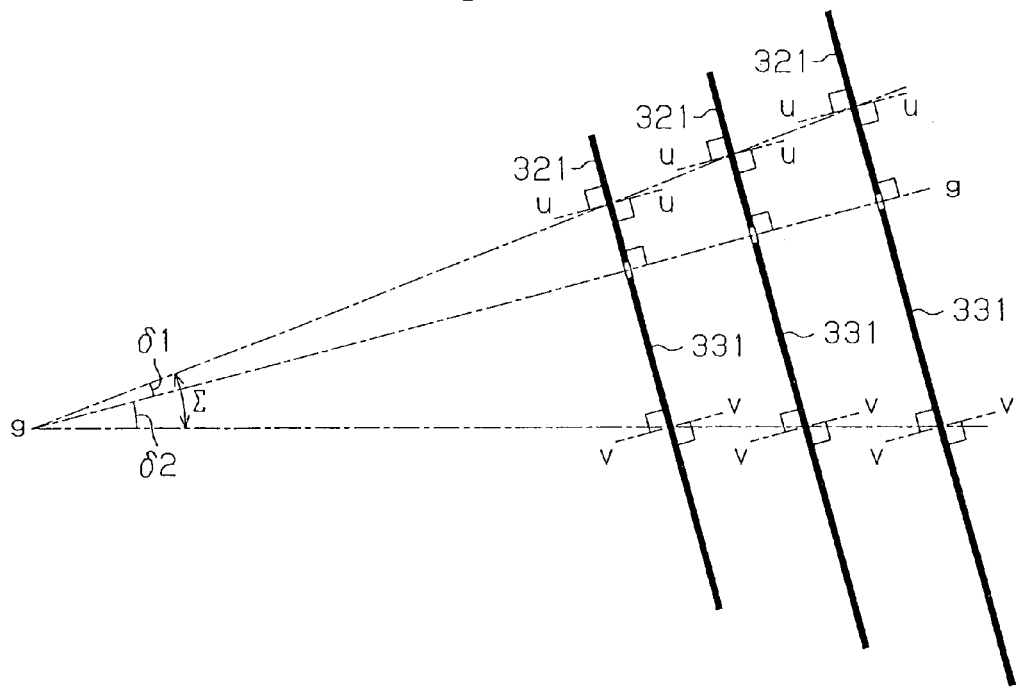
FIG. 1(A) is an explanatory view showing a concept of the present invention.
FIG. 1(B) is an explanatory view showing a concept of a conventional structure.
Figure 1:
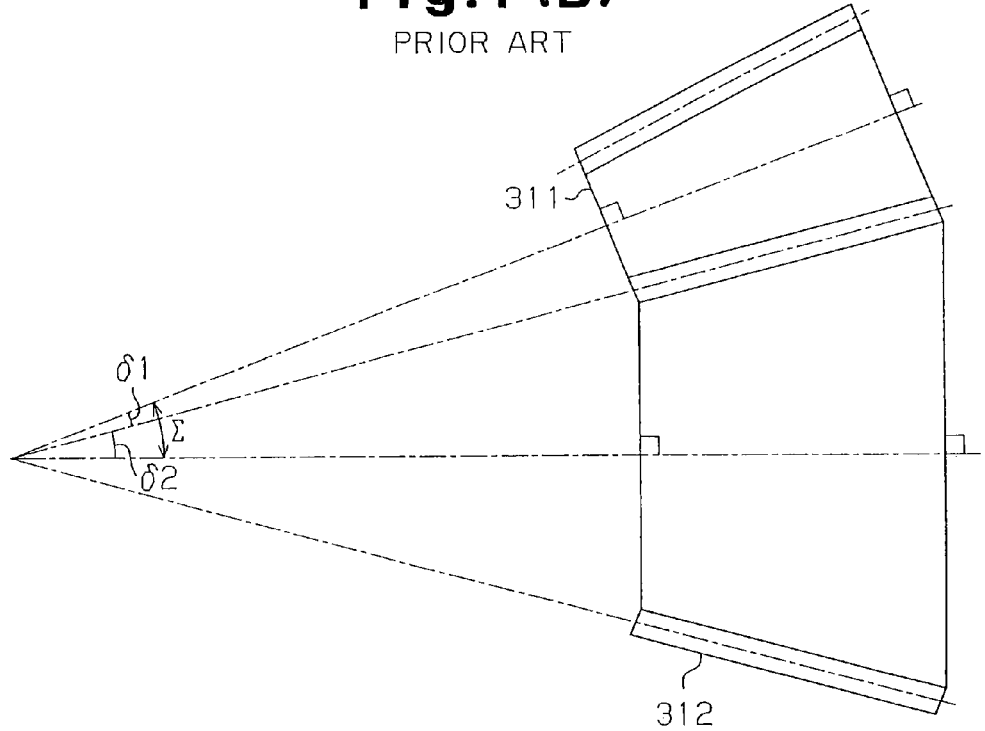

In this embodiment, the small-diameter conical gear 32 and the large-diameter conical gear 33 constructing the gear pair 31 can be conceived of as an aggregation of infinitely thin imaginary cylindrical gears 321 and 331 whose width is zero, as schematically shown in FIG. 1A. These imaginary cylindrical gears 321 and 331 respectively have a center axis u-u and a center axis v-v which are in parallel to a line g-g (hereinafter, the line g-g is referred to as a conical line) extending along a conical surface passing through the reference pitch point P of the gears 32 and 33. Accordingly, in the same manner as the imaginary cylindrical gears 321 and 331 shown in FIG. 1A, there exist an infinitude of center axes u-u and center axes v-v. Further, on one line w-w orthogonal to the conical line g-g at the reference pitch point P, the imaginary cylindrical gears 321 and 331 are defined as a helical spur gear in which the addendum modification amount of the gear teeth 34A is zero. Hereinafter, the helical spur gear in which the addendum modification amount is zero is set to be standard imaginary cylindrical gears 321A and 331A. As shown in FIG. 3, the gear teeth 34C of the imaginary cylindrical gears 321 and 331 at a smaller diameter side than the standard imaginary cylindrical gears 321A and 331A are profile shifted to the negative side, and the gear teeth 34B of the imaginary cylindrical gears 321 and 331 at a larger diameter side than the standard imaginary cylindrical gears 321A and 331A are profile shifted to the positive side.

Parameters of the imaginary cylindrical gears 321 and 331 are set in accordance with a numerical expression 2. Reference symbol $m_v$, in the expression denotes a module of the imaginary cylindrical gears 321 and 331, reference symbol $\beta$ denotes a spiral angle of the teeth of the imaginary cylindrical gears 321 and 331, that is, the conical gears 32 and 33, reference symbol $m_n$, denotes a module of the imaginary cylindrical gears 321 and 331 in a vertical cross section of a tooth which is set such that a cross sectional involute tooth profile can be obtained or which is perpendicular to the spiral angle $\beta$ in the imaginary cylindrical gears 321 and 331, reference symbol $\alpha_v$, denotes a pressure angle of the imaginary cylindrical gears 321 and 331, reference symbol $\alpha_n$ denotes a pressure angle of the imaginary cylindrical gears 321 and 331 in the vertical cross section of the tooth, reference symbol z denotes the number of teeth of the conical gears 32 and 33, reference symbol $z_v$ denotes the number of teeth of the imaginary cylindrical gears 321 and 331, and reference symbol δ denotes a conical angle of the conical gears 32 and 33, respectively.

Numerical Expression 2

Module $m_v = m_n / \cos \beta$

Pressure angle $\alpha_v = \tan^{-1}(\tan \alpha_n / \cos \alpha)$

Number of teeth $Z_v = Z / \cos \delta$

Accordingly, in the case where the spiral angle β does not exist in the conical gears 32 and 33, in the numerical expression 2, that is, in the case where the spiral angle β is 0, the module $m_v$ and the pressure angle $\alpha_v$ of the imaginary cylindrical gears 321 and 331 are equal to the module $m_v$, and the pressure angle $\alpha_v$ of the conical gears 32 and 33 having no spiral. In the case where the spiral exists in the conical gears 32 and 33, the module $m_v$ and the pressure angle $\alpha_v$ of the imaginary cylindrical gears 321 and 331 are equal to values corresponding to the spiral angle β. As mentioned above, the module $m_v$ and the pressure angle $\alpha_v$ are set in correspondence with the value of the spiral angle β of the tooth with respect to the infinitude of imaginary cylindrical gears 321 and 331, in accordance with the numerical expression 2. Further, the number of teeth $z_v$ of the imaginary cylindrical gears 321 and 331 is determined in correspondence with the conical angles δ1 and δ2 of the conical gears 32 and 33. Accordingly, the present embodiment is different from the structure disclosed in Japanese Laid-Open Patent Publication No. 6-94101, in which the number of teeth z of the conical gears 32 and 33 is used as it is.

Figure 5:
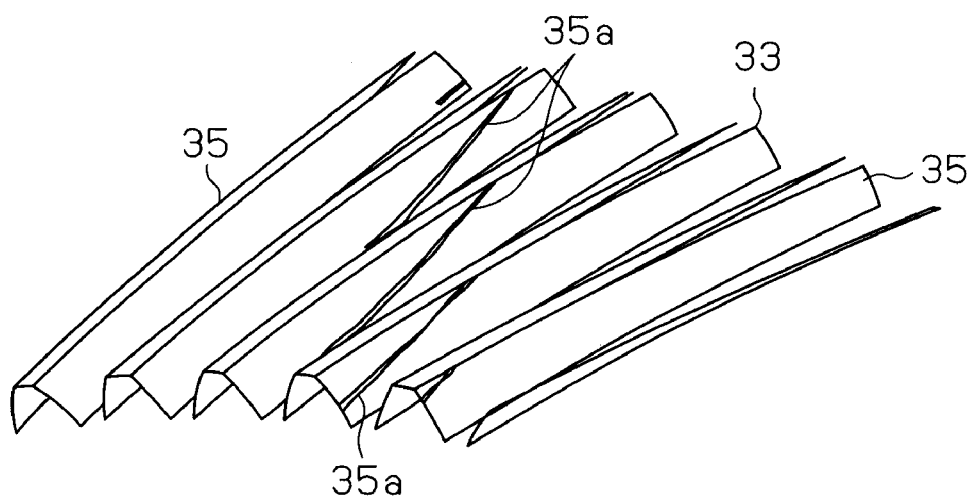
FIG. 5 is a perspective view partially showing a contact locus of the teeth.

If the imaginary cylindrical gears 321 and 331 set as mentioned above are engaged with each other without being in biased contact or being in point contact with each other, as shown in FIG. 5, it is possible to obtain a continuous engagement over a whole region in an axial direction (in the face width direction) of the gear pair 31. Respective data of the conical gears 32 and 33 in this case can be set in accordance with the following expressions. FIG. 5 expresses an engagement locus 35a of the teeth. Accordingly, if all the teeth of the gear pair 31 shows a linear engagement locus shown in FIG. 5, it is possible to bring the teeth 34 and 35 of the gears 32 and 33 into surface contact with each other in a wide range.

In FIG. 7, a center distance a between the imaginary cylindrical gears 321 and 331 engaging with each other is expressed by numerical expression 3. Reference symbol $r_1'$ in the expression denotes a diameter of a pitch circle of the imaginary cylindrical gear 321, reference symbol $r_2'$ denotes a diameter of a pitch circle of the imaginary cylindrical gear 331, reference symbol R denotes a con-distance of the conical gears 32 and 33, and reference symbol y denotes a distance from a large-diameter end of the gears 321 and 331 on the conical line g-g to the imaginary cylindrical gears 321 and 331, respectively.

Numerical Expression 3

$$a = r_1' + r_2' = (R-y)(\tan \delta_1 / \cos \delta_2)$$

$$r_1' = (R \times y) \tan \delta_1 \quad r_2' = (R-y) \tan \delta_2$$

A center distance $a_0$ of the standard imaginary cylindrical gears 321A and 331A is shown in numerical expression 4. Reference symbol $y_0$ in the expression denotes a distance from the large diameter end of the gears 321 and 331 to the standard imaginary cylindrical gears 321A and 331A, reference symbol $z_{v1}$ denotes the number of teeth of the small-diameter standard imaginary cylindrical gear 321A, and reference symbol $z_{v2}$ denotes the number of teeth of the large-diameter standard imaginary cylindrical gear 331A, respectively.

Numerical Expression 4

$$a_0 = r_1 + r_2 = (R - y_0)(\tan\delta_1 + \tan\delta_2)$$

$$r_1 = (R - y_0)\tan\delta_1 = \frac{m_v z_{v1}}{2} \quad y_0 = \frac{R\tan\delta_1 - m_v z_{v1}/2}{\tan\delta_1}$$

$$r_2 = (R - y_0)\tan\delta_2 = \frac{m_v z_{v2}}{2} \quad y_0 = \frac{R\tan\delta_2 - m_v z_{v2}/2}{\tan\delta_2}$$

Figure 4A:
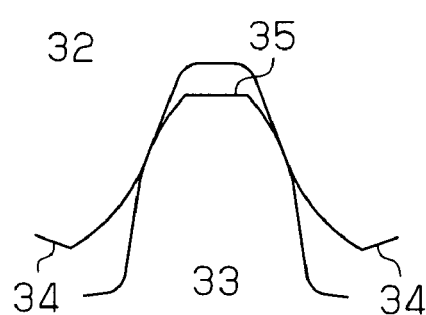
FIG. 4(A) is a diagrammatic front elevational view showing an engagement state of the teeth.
Figure 4B:
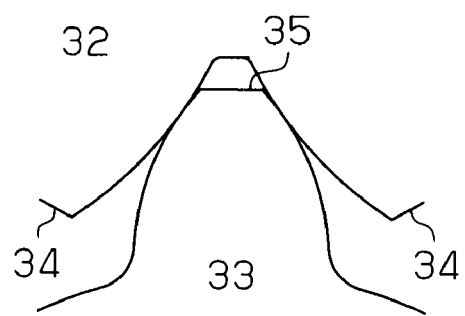
FIG. 4(B) is a diagrammatic front elevational view showing the engagement state of the teeth.

Next, an engagement pressure angle $\alpha_v'$ in the right-angled surface of the conical line of the imaginary cylindrical gears 321 and 331 is shown in numerical expression 5. The right-angled surface of the conical line corresponds to the surface perpendicular to the width direction of the conical involute gear. Reference symbol $\alpha_v$ in the expression denotes a pressure angle of the standard imaginary cylindrical gears 321A and 331A, reference symbol $x_1$ denotes an addendum modification coefficient of the small-diameter imaginary cylindrical gear 321, reference symbol $x_2$ denotes an addendum modification coefficient of the large-diameter imaginary cylindrical gear 331, respectively. Accordingly, if the imaginary cylindrical gears 321 and 331 satisfy the expression (1) in the numerical expression 5, all the imaginary cylindrical gears 321 and 331 can achieve a normal engagement with no gap, as shown in FIGS. 4(A) and 4(B). As a result, it is possible to obtain a continuous engagement in all the regions in a tooth trace direction of the gear pair 31.

Numerical Expression 5

$$\cos\alpha_v' = \frac{a_0}{a}\cos\alpha_v \qquad (1)$$

$$inv\alpha_v' = \frac{2(x_1 + x_2)}{z_{v1} + z_{v2}}\tan\alpha_v + inv\alpha_v$$

in which $inv\alpha = \tan\alpha - \alpha$

The radii of the imaginary cylindrical gears 321 and 331 are expressed as numerical expression 6.

$$r'_1 = r_1 \frac{\cos\alpha_v}{\cos\alpha'_v}$$
$$r'_2 = r2 \frac{\cos\alpha_v}{\cos\alpha'_v}$$

Numerical Expression 6

The relationship between the addendum modification coefficients $x_1$ and $x_2$ of the imaginary cylindrical gears 321 and 331 is shown in numerical expression 7.

$$x_1 + x_2 = \frac{(z_{v1} + z_{v2})(inv\alpha'_v - inv\alpha_v)}{2\tan\alpha_v}$$

Numerical Expression 7

In order to suitably engage the imaginary cylindrical gears 321 and 331 with each other, it is necessary to bring the thickness of the tooth into line with the width of the tooth space on the pitch circle in which the imaginary cylindrical gears 321 and 331 are engaged with each other, as shown in FIGS. 4(A) and 4(B). In other words, if the thickness of the tooth and the width of the tooth space are equal on the pitch circle in which the imaginary cylindrical gears 321 and 331 are engaged, it is possible to suitably engage the gears with each other. In this case, a relationship of numerical expression 8 is satisfied. Reference symbol p' in the expression denotes a tooth pitch on the engagement pitch circle after being profile shifted, and reference symbols $p_1'$ and $p_2'$ denote tooth pitches of the imaginary cylindrical gears 321 and 331 on the engagement pitch circle after being profile shifted, respectively. Reference symbols $s_1'$ and $s_2'$ denote tooth thicknesses of the imaginary cylindrical gears 321 and 331 on the engagement pitch circle after being profile shifted, respectively. Reference symbols $e_1'$ and $e_2'$ denote widths of the tooth spaces of the imaginary cylindrical gears 321 and 331 on the engagement pitch circle after being profile shifted, respectively. Reference symbol s denotes a tooth thickness on the engagement pitch circle of the standard imaginary cylindrical gears 321A and 331A, and reference symbol x denotes an addendum modification coefficient of the standard imaginary cylindrical gears 321A and 331A, respectively.

$$p' = p'_1 = \frac{2\pi r'_1}{z_{v1}} = p'_2 = \frac{2\pi r'_2}{z_{v2}}$$
$$p' = s'_1 + e'_1 = s'_2 + e'_2$$
$$s'_1 = e'_1 = s'_1 = e'_2$$
$$s' = s\frac{r'}{r} + 2r'(inv\alpha_v - inv\alpha'_v)$$
$$s = m_v\left(\frac{\pi}{2} + 2\times\tan\alpha_v\right)$$

Numerical Expression 8

The addendum modification coefficients $x_1$ and $x_2$ of the imaginary cylindrical gears 321 and 331 are determined on the basis of numerical expression 9.

$$x_1 = \frac{z_{v1}(inv\alpha'_v - inv\alpha_v)}{2\tan\alpha_v} = z_{v1}f(inv\alpha'_v)$$

Numerical Expression 9

-continued
$$x_2 = \frac{z_{v2}(inv\alpha'_v - inv\alpha_v)}{2\tan\alpha_v} = z_{v2}f(inv\alpha'_v)$$

The addendum modification coefficients $x_1$ and $x_2$ are functions of the pressure angles $\alpha_v$ and $\alpha_v'$, which are variables. Accordingly, the addendum modification coefficients $x_1$ and $x_2$ are non-linear functions. An allocation of the addendum modification coefficients $x_1$ and $x_2$ is not only related to the conical angles δ1 and δ2 of the imaginary cylindrical gears 321 and 331, but also related to the number of teeth of the imaginary cylindrical gears 321 and 331, as shown in numerical expression 10. Accordingly, the conical involute gears 32 and 33 can obtain a non-linear addendum modification coefficient, and can accordingly obtain an engagement of being in line contact with each other.

$$\frac{x_1}{x_2} = \frac{z_{v1}}{z_{v2}} = \frac{z_1\cos\delta_2}{z_2\cos\delta_1}$$

Numerical Expression 10

As mentioned above, in accordance with this embodiment, a concept of the imaginary cylindrical gears 321 and 331 is introduced, and the conical gears 32 and 33 are respectively defined as the aggregate of the imaginary cylindrical gears 321 and 331. Further, the structure is made such as to precisely engage the imaginary cylindrical gears 321 and 331 with each other by changing the addendum modification coefficient by using the number of teeth taking the conical angles of the conical gears 32 and 33 into consideration in the respective imaginary cylindrical gears 321 and 331 (refer to the numerical expression 10). Accordingly, it is possible to achieve a smooth engagement between the conical gears 32 and 33, under a condition having the same module, pressure angle and number of teeth, and being different only in the addendum modification coefficient.

Further, in each of the cross sections perpendicular to the face width, the pressure angle and the engagement angle come into line in the case where the profile shift does not exist. However, the pressure angle and the engagement angle are different in the case where the profile shift exists. Accordingly, in each of the surfaces perpendicular to the face width, it is necessary that a total of the addendum modification coefficients of the gear pair satisfy a predetermined relationship as shown in the numerical expression 7 and the numerical expression 9, and the pitches of the gears on the engagement pitch circle come into line as shown in the numerical expression 8. In other words, if these relationships are satisfied in each plane perpendicular to the face width, it is possible to obtain an engagement position at one point as shown in FIGS. 4(A) and 4(B). Accordingly, it is possible to obtain the conical involute gear which is simultaneously engaged in all the regions of the face width and comes into surface contact. Further, even if the spiral angle β exists in the conical gears 32 and 33, the module and the pressure angle are set in correspondence with the spiral angle β as is apparent from the numerical expression 2. Accordingly, it is possible to bring the conical gears 32 and 33 into contact with each other in a wide area, and it is possible to further smoothly engage with each other.

Figure 8:
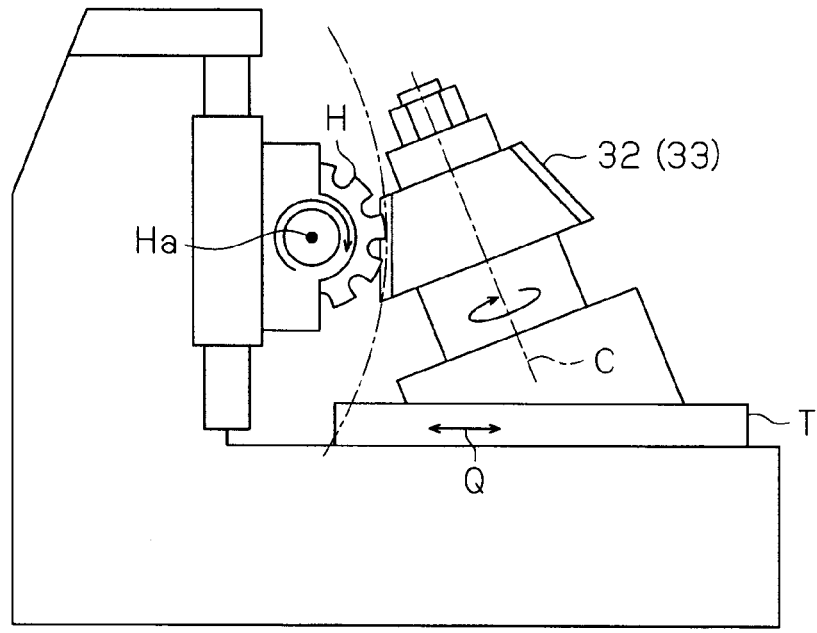
FIG. 8 is an explanatory view showing a gear generating process by a gear hobbing machine.
Figure 9:
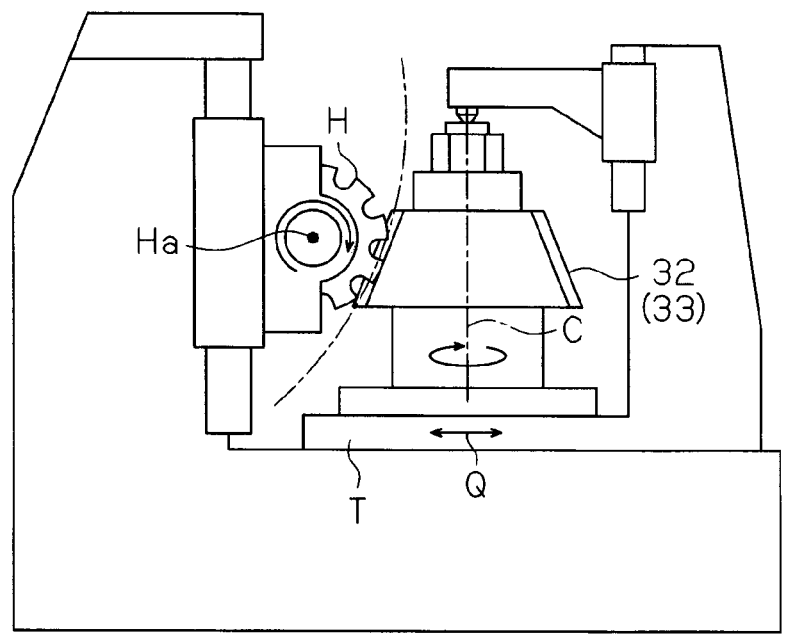
FIG. 9 is an explanatory view showing another gear generating process by the gear hobbing machine.
Figure 10A:
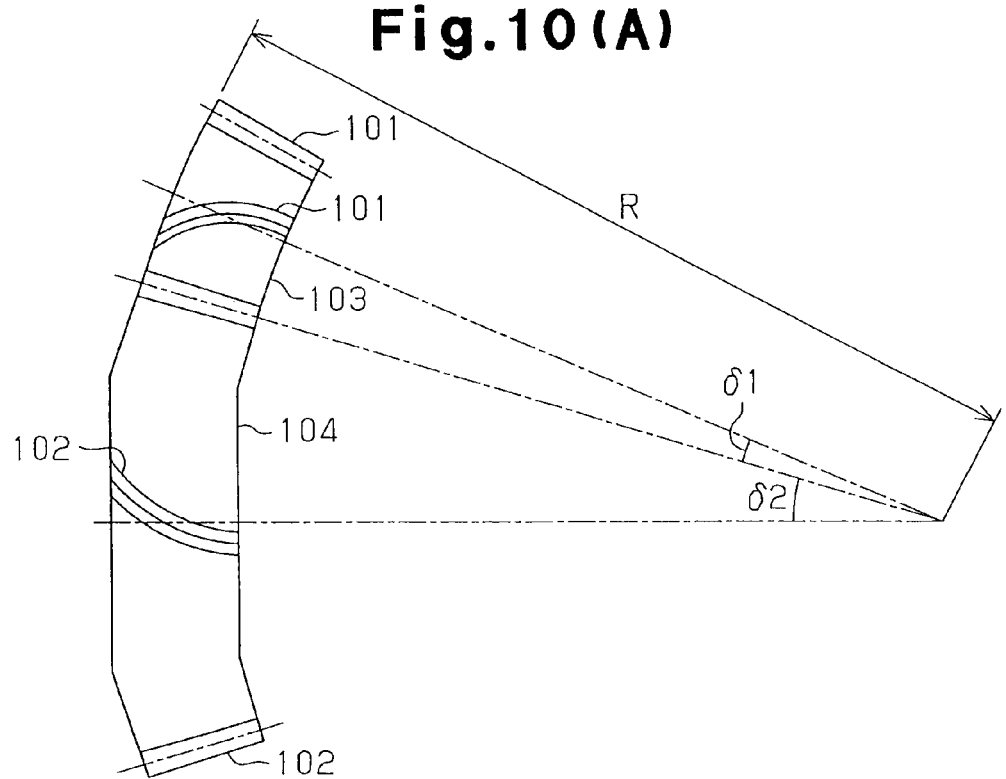
FIG. 10(A) is an explanatory view showing an engagement state of a conventional bevel gear.
Figure 10B:
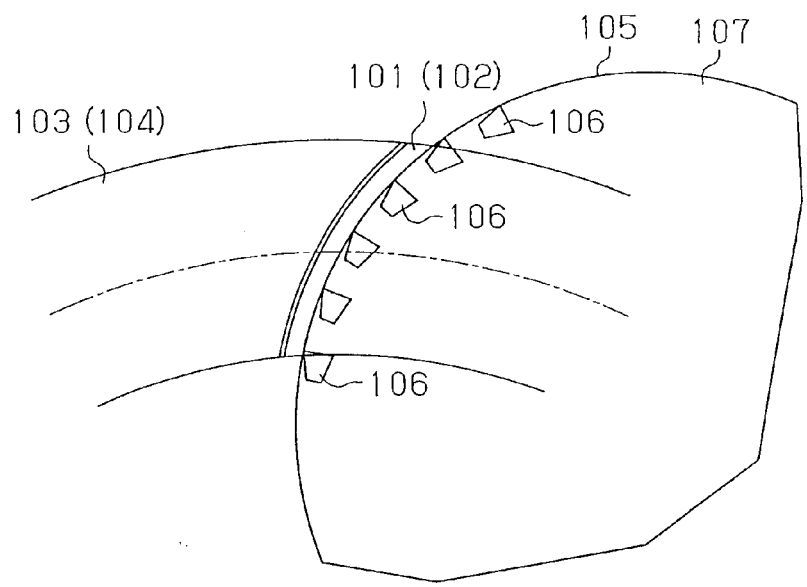
FIG. 10(B) is an explanatory view showing machining by a milling cutter.
Figure 10C:
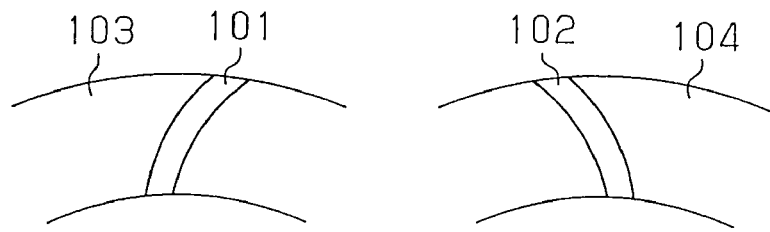
FIG. 10(C) is an explanatory enlarged view showing a tooth of a bevel gear.
Figure 11:
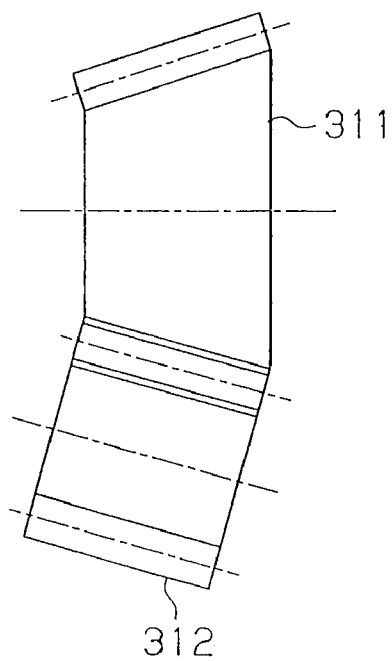
FIG. 11 is an explanatory view showing a gear pair having a conventional structure.

Each of the conical gears 32 and 33 can be formed by gear cutting by using a gear hobbing machine shown in FIGS. 8 and 9. As shown in FIG. 8, a position of a hob spindle Ha is fixed in a state in which an axis C of each of the conical gears 32 and 33 (the workpieces) is inclined. Further, the gear cutting work of each of the conical gears 32 and 33 is executed such that the addendum modification coefficient is changed to be non-linear by moving the work T in a direction of arrow Q shown in FIG. 8 while rotating the workpiece axis C as well as moving the hob H along the tooth trace at a time of executing the gear cutting.

Further, as shown in FIG. 9, the workpiece axis C may be operated as follows without inclining the workpiece axis C. In other words, the workpiece axis C may be moved in a direction of arrow Q shown in FIG. 9 in such a manner that the gear corresponding to the conical angles δ1 and δ2 of the conical gears 32 and 33 can be generated in correspondence to the movement in the gear trace direction of the hob H. In this case, the other movement than the movement mentioned above in the direction of arrow Q is executed to the work axis C, in such a manner that a change amount of the addendum modification coefficient is generated in addition to the generation of the tooth.

Further, in place of moving the workpiece axis C in the direction of arrow Q, a hob axis Ha may be moved in the direction of arrow Q. As mentioned above, it is possible to easily execute the gear generating tooth cutting with respect to each of the conical gears 32 and 33, only by controlling the movement of the workpiece axis C or the hob axis Ha in the direction of arrow Q, while using the gear hobbing machine in the same manner as the generation of the normal involute gear. Further, since the modules, the numbers of teeth, and the pressure angles of the respective conical gears 32 and 33 are equal, it is possible to execute the gear generating process using the same cutter.

The embodiment mentioned above has the following advantages.

(1) The conical gears 32 and 33 respectively correspond to the aggregates of the imaginary cylindrical gears 321 and 331. Accordingly, it is possible to change the addendum modification coefficient of each of the imaginary cylindrical gears 321 and 331 by using the number of teeth of each of the imaginary cylindrical gears 321 and 331. Accordingly, it is possible to bring the conical gears 32 and 33 into surface contact with each other, and it is possible to achieve a suitable engagement between the conical gears 32 and 33.

(2) Since the spiral angle β of the conical gears 32 and 33 is reflected on the change of the addendum modification coefficient, it is possible to obtain a precise engagement in a wide area on the basis of the involute tooth profile, regardless whether the conical gears 32 and 33 are constituted by straight teeth or helical teeth.

(3) Since it is possible to properly allocate the addendum modification coefficient to each of the conical gears 32 and 33, it is possible to engage the conical gears 32 and 33 with no gap in all the regions in the tooth trace direction of the conical gears 32 and 33.

(4) Each of the conical gears 32 and 33 can be easily generated and machined by using the gear hobbing machine. Further, since the modules, the numbers of teeth, and the pressure angles are equal in the conical gears 32 and 33 constructing the gear pair 31, it is possible to generate and machine teeth by the same cutter. Accordingly, it is possible to simplify an initial setup at a time of machining, and it is possible to further easily manufacture each of the conical gears 32 and 33.

(5) It is possible to set the standard imaginary cylindrical gears 321A and 331A in which the addendum modification amount is zero, in an arbitrary intermediate portion in the face width direction, and it is possible to respectively set the imaginary cylindrical gears 321 and 331 that are profile shifted to a positive side, and the imaginary cylindrical gears 321 and 331 that are profile shifted to a negative side, on both sides of the imaginary cylindrical gears 321A, 331A having no addendum modification. Accordingly, it is possible to form the conical gears 32 and 33 having a large conical angle.

The present embodiment may be modified as follows.

The teeth of the conical gears 32 and 33 may be changed to straight teeth.

One of the two gears 32 and 33 constructing the gear pair 31 may be a cylindrical gear.

The present invention may be applied to a structure in which a plurality of gears are engaged with one gear, or a structure in which a plurality of gears are continuously engaged so as to form gear train. In this case, the gear pair is constructed by a pair of gears engaging with each other.

The diameters of the conical gears 32 and 33 may be equalized.

The invention claimed is:

1. A gear pair constituted by a small diameter conical involute gear and a large diameter conical involute gear,
wherein the conical involute gears each have helical teeth having an involute tooth profile and a spiral angle,
wherein an addendum modification coefficient of each of the helical teeth is non-linearly changed in a face width direction of each of the conical involute gears,
wherein the conical involute gears are engaged with each other,
wherein the conical involute gears are each defined by an aggregate of a plurality of imaginary cylindrical gears, each of the imaginary cylindrical gears has an axis which is in parallel to a conical surface of the conical involute gears passing through a reference pitch point, each of the imaginary cylindrical gears has the same module,
wherein in the case of setting the number of teeth of one of the conical involute gears to z, setting a conical angle of the one of the conical involute gears to δ, and setting the number of teeth of the imaginary cylindrical gears thereof to $z_v$, setting a pressure angle of the imaginary cylindrical gears thereof to $\alpha_v$, setting a pressure angle of the imaginary cylindrical gears thereof in a vertical cross section of a tooth to $\alpha_n$, setting a module of the imaginary cylindrical gears thereof to $m_v$, setting a spiral angle of a tooth to β, and setting a module of the imaginary cylindrical gears thereof in a vertical cross section of a tooth to $m_n$, relational expressions $$z_v = z/\cos \delta,$$

$$m_v = m_n/\cos \beta, \text{ and}$$

$$\alpha_v = \tan^{-1}(\tan \alpha_n/\cos \beta) \text{ are satisfied,}$$

wherein in the case of setting one of the plurality of imaginary cylindrical gears so that the addendum modification coefficient amount is zero to a standard imaginary cylindrical gear, setting a pressure angle of the standard imaginary cylindrical gear to $\alpha_v$, setting an engagement pressure angle in a surface perpendicular to a conical line of one of the plurality of imaginary cylindrical gears to $\alpha_v'$, setting an addendum modification coefficient of a smaller-diameter imaginary cylindrical gear to $x_1$, setting an addendum modification coefficient of a larger-diameter imaginary cylindrical gear to $x_2$, setting the number of teeth of the smaller-diameter imaginary cylindrical gear to $z_{v1}$, and setting the number of teeth of the larger-diameter imaginary cylindrical gear to $z_{v2}$, relational expression $inv\alpha_v' = [2(x_1+x_2)/(z_{v1}+z_{v2})] \tan \alpha_v + inv\alpha_v$, $x_1 = z_{v1}(inv\alpha_v' - inv\alpha_v)/2 \tan \alpha_v = z_{v1} f(inv\alpha_v')$, and $x_2 = z_{v2}(inv\alpha_v' - inv\alpha_v)/2 \tan \alpha_v = z_{v2} f(inv\alpha_v')$ are satisfied, wherein the addendum modification coefficients of the small diameter conical involute gear and the large diameter conical involute gear are obtained by the relational expressions.

2. The gear pair according to claim 1,
wherein, in the case of setting the number of teeth of the small-diameter conical involute gear to $z_1$, setting the number of teeth of the large-diameter conical involute gear to $z_2$ a conical angle of a small-diameter conical gear to $\delta 1$, and setting a conical angle of a large-diameter conical gear to $\delta 2$, a relational expression $(x_1/x_2) = z_{v1}/z_{v2} = z_1 \cos \delta 2 / z_2 \cos \delta 1$ is satisfied.

3. The gear pair according to claim 2,
the standard imaginary cylindrical gear is arranged between a large-diameter end and a small-diameter end of the conical involute gears, the imaginary cylindrical gears between the small-diameter end and the standard imaginary cylindrical gear are negatively profile shifted, and the imaginary cylindrical gears between the large-diameter end and the standard imaginary cylindrical gear are positively profile shifted.

* * * * *